United States Patent [19]

Peterson

[11] Patent Number: 4,917,049
[45] Date of Patent: Apr. 17, 1990

[54] SAFETY RELEASABLE COLLAR FOR ANIMALS

[76] Inventor: Linda Peterson, 1247 Gardena Ave. NE., Fridley, Minn. 55432

[21] Appl. No.: 267,580

[22] Filed: Nov. 7, 1988

[51] Int. Cl.⁴ ............................................. A01K 27/00
[52] U.S. Cl. .................................................... 119/106
[58] Field of Search ................... 119/96, 106, 109; 24/306, 442; 128/DIG. 15

[56] References Cited

U.S. PATENT DOCUMENTS

| | | | |
|---|---|---|---|
| 2,612,139 | 9/1952 | Collins | 119/106 |
| 3,086,268 | 4/1963 | Chaffin, Jr. | 119/106 |
| 3,311,088 | 3/1967 | Peterlin | 119/106 X |
| 3,589,341 | 6/1971 | Krebs | 119/106 |
| 3,605,384 | 9/1971 | Pacini | 119/96 X |
| 3,817,218 | 6/1974 | Bongiovanni | 119/106 |
| 3,994,265 | 11/1976 | Banks | 119/106 |
| 4,044,725 | 8/1977 | Miller | 119/106 |
| 4,149,540 | 4/1979 | Hasslinger | 128/DIG. 15 |
| 4,180,016 | 12/1979 | George | 119/106 |
| 4,426,957 | 1/1984 | Horrigan | 119/106 |
| 4,541,364 | 9/1985 | Contello | 119/109 |
| 4,787,340 | 11/1988 | Kirtley | 119/106 |
| 4,811,695 | 3/1989 | Higgins | 119/106 |

OTHER PUBLICATIONS

"Wholesale Dog Equipment and Kennel Supplies", R. C. Steele publication of Dec. 31, 1988, pp. 20-21 and cover.

Primary Examiner—Robert P. Swiatek
Assistant Examiner—Nicholas D. Lucchesi
Attorney, Agent, or Firm—Vidas and Arrett

[57] ABSTRACT

A dual purpose animal collar is described where the collar consists of a single length of material having the ends thereof provided with a connector for releasably coupling them together to form a continuous ring. The coupling is releasably disconnectable upon reaching a predetermined pressure. Each end of the collar assembly is provided with a ring member attached thereto within one ring sized to pass through the other so that the collar can be used in the normal way of a collar by a snap ring holding the two rings fixed to one another and in such a manner as to prevent release of the collar under the predetermined pressure, as a safety collar and as a choke collar.

10 Claims, 1 Drawing Sheet

SAFETY RELEASABLE COLLAR FOR ANIMALS

BACKGROUND OF THE INVENTION

1. Field of the Invention

This invention relates to a safety collar for animals including cats and dogs. The invention provides a collar which, when worn by the animal primarily for the purpose of carrying animal identification, is constructed so as to be pressure releasable under a predetermined load. The pressure release means is then reattachable. By being able to set the collar to be released at a predetermined loading, strangulation of the animal by being caught on a fence or other obstacle is substantially prevented. The collar is provided with means to readily convert it to use with an attached leash to be non-releasable under pressure.

2. Description of the related art

I am aware that others have recognized the problem of animals becoming strangled by their collar. I am also aware that one proposed solution to this possibility has been to include within the collar an elastic section which allows the collar diameter to become enlarged enough to allow the animal to slip out of it.

Yet another collar is the type having a "roll ring" opposite the joinable ends of the collar.

Another attempted solution to the problem of potential strangulation has been in connection with slip or choke collars. In these types of collars, the increase of tension, if it should occur on the main end, would result in a continuous tightening of the collar leading to strangulation. There are snap means proposed in the prior art which would prevent the slip or choke collar from actuating when not needed.

I have also seen suggestions of sewing the remote ends of a collar together with a fairly light degree of attachment so that they are adequate for maintaining identification tags but would break at the stitching if subjected to any significant amount of stress.

SUMMARY OF THE INVENTION

The present invention provides a collar which is releasably joined at its ends to form a complete ring, but is joined in such a manner as to be released upon reaching a predetermined tension. The collar, in addition to being releasable, also is rejoinable without having to be resewn as would be the instance of one of the prior techniques discussed above.

The collar in accordance with my invention is also provided with an attached ring at each of the ends so that when the collar is joined together connecting means such as a snap ring can be used to join the two rings and thus provide a collar usable in the same way as a regular animal collar is used. Further ring members can be provided and joined to the collar as desired for attaching of identification tags and the like. The releasable means for joining the two ends of the collar can take a variety of forms and are described hereinbelow. One such means is the use of velcro at each end to overlap as desired for the predetermined release under tension. Other means will be described hereinbelow.

Referring to the drawings there is illustrated in somewhat schematic form several different constructions for accomplishing the purposes of the invention.

DESCRIPTION OF THE PREFERRED EMBODIMENTS

The invention can readily by adapted to be usable either with a flat webbing type collar, with a circular cross section material collar or any of a variety of other types of collars including choke chains. It is desirable to have the ends reasonably flat when using the preferred joining material which is Velcro or magnets. The invention will be described with respect to a flat ribbon material, it being understood that other cross-section materials can be used.

Figure 1:
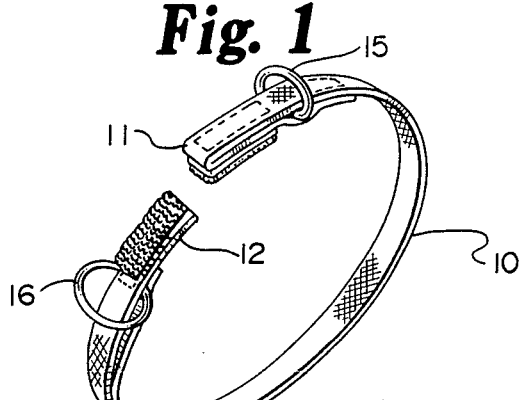
FIG. 1 shows a collar having substantially flat end regions for joining and provided with tension releasable means.

Referring to FIG. 1 there is seen a flat webbing type belt 10 which has two remote ends 11 and 12. End 11 is provided on a underside surface thereof a facing of a Velcro material. It is also provided with a D-shaped ring 15 that is joined by any appropriate well known means to the webbing. In the preferred form either ring 15 or 16 is slidably retained within a gap between fabric 10 and fabric 21. End 12 is provided with a Velcro surface 14 at its upper surface and is also provided with a D-shaped ring 16. It can be readily seen that ends 11 and 12 can be joined by pressing together surfaces 13 and 14 to provide for an engagement. The degree of overlap of 13 and 14 may be used to directly control the amount of tension needed to pull these two ends apart, should the animal's collar become caught on some object when the animal is not on leash. It is expected that a more general case of construction of collars in accordance with the invention will be to manufacture collars where a full lapping gives the desired point of release at a predetermined tension. When the animal is to be controlled by being on leash, then rings 15 and 16 are jointly connected to a remote leash means (not shown). In such an event even if surface 13 and 14 should separate, the animal would still be restrained by the connecting of the two ends of the leash.

As can be seen ring 15 is positionable adjacent to and remote from ring 16. Holding means such as flap of material 22 with Velcro tip may be used to fix ring 16 in a position remote from ring 15. This will insure that when the collar is in the tension release usage, no accidental fixing of the rings together will occur. For example, it is possible that if the rings are in close proximity to one another, a fence barb could engage both rings and defeat the tension release.

Figure 1A:
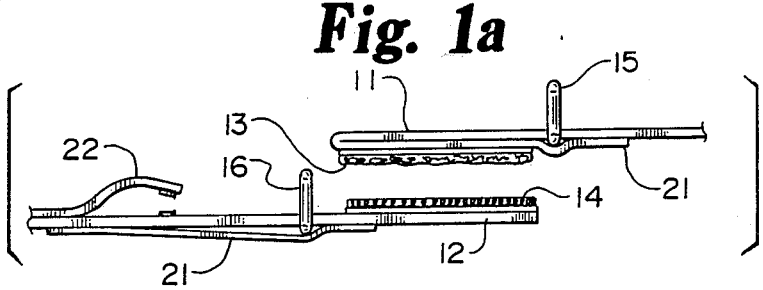
FIGS. 1(a) and (b) shows a side elevational view of the ends only of the collar of FIG. 1.
Figure 1B:
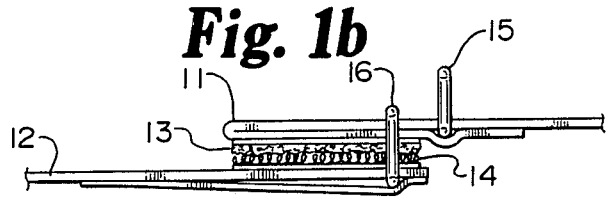

FIG. 1B shows a slight modification of FIG. 1A in that the rings 15 and 16 are positioned adjacent the end of the portion 12 and at the position of total overlap of Velcro 13 and 14. This type of construction gives the two rings juxtaposition to one another for an attachment of a conventional snap ring leash member.

It is also contemplated that flat magnetic material can be substituted for Velcro 13 and 14. The magnets would releasably adhere to one another. By varying of the strength of the magnetic field and/or the engaging surface area the tension required to disengage may be tailored to meet varying needs.

The collar in FIG. 1 may also be used as a choke collar as well as a safety release collar or as a regular collar. This can be accomplished readily when the "D" rings are sized to enable one ring 15 to pass through ring 16. Ring 16 then acts as a noose former. Ring 15 is joined to a leash and end 11 slides in ring 16 to form a choke collar.

Figure 2:
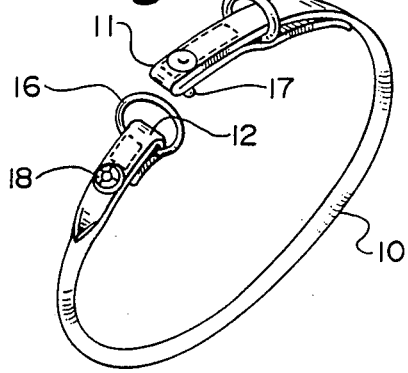
FIG. 2 shows a collar having tension releasable snap means.

In FIG. 2 there is illustrated an alternate form of tension releasable collar in accordance with the invention. Similar parts are given the same numerical designation. In this instance, a conventional snap member comprised of elements 17 and 18 form the tension releasable mechanism when the collar is on the animal and the animal is not on a leash. In this instance, by adjusting the amount of tension necessary to separate element 18 from element 17, the collar can be adjusted to conform with the size of the animal.

Figure 3:
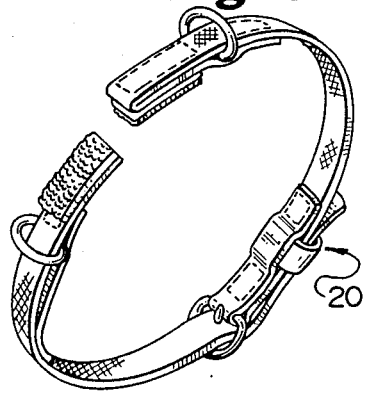
FIG. 3 shows a collar in accordance with the invention having a length adjusting means intermediate the tension releasable means; and, FIG. 4 shows an alternate bayonet style snap tension releasable means.

Referring to FIG. 3, there is seen a belt in accordance with either FIGS. 1 or 2 wherein a conventional belt adjusting means 20 is shown intermediate the ends 11 and 12. This type of construction permits the owner to readily adjust the overall diameter of the collar when placed on the animal so that it will be possible to have a firm yet not too tight a collar around the neck of the animal. The collar in this instance is composed of two lengths joined at the belt adjusting means and also joinable at ends 11 and 12.

Figure 2A:
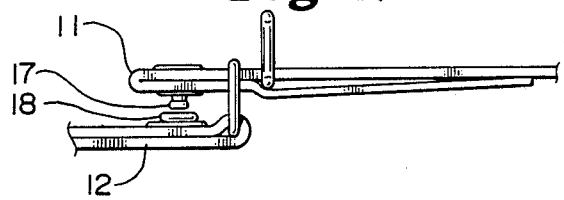
FIG. 2a shows a closeup of the correction system of FIG. 2.
Figure 4:
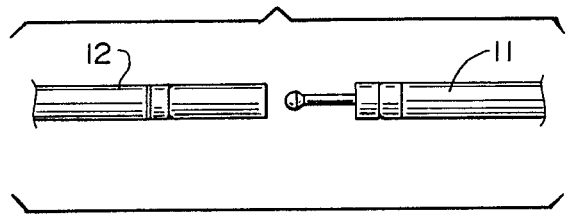

FIG. 4 shows a variation of the snap arrangement of FIG. 2 and FIG. 2A. In this instance a snap is positioned so as to interlock along the length of the main belt member 11 and 12. Tension is thus direct, rather than in a somewhat oblique angle as illustrated with respect to FIG. 2 and FIG. 2A.

It will thus be seen that there has been described above a safety releasable collar for an animal that can be adjusted as needed to be readily releasable at some predetermine tension. When the collar is to be used for restraining an animal when on a leash, the two remote ends can be fixedly joined to one another by means of rings such as D-rings 15 and 16.

While this invention may be embodied in many different forms, there are shown in the drawings and described in detail herein specific preferred embodiments of the invention. The present disclosure is an exemplification of the principles of the invention and is not intended to limit the invention to the particular embodiments illustrated.

This completes the description of the preferred and alternate embodiments of the invention. Those skilled in the art may recognize other equivalents to the specific embodiment described herein which equivalents are intended to be encompassed by the claims attached hereto.

What is claimed;

1. A combined safety collar, conventional collar and choke collar for animals comprising:
   (a) a length of relatively strong material having first and second ends;
   First and second metal rings joined respectively to said material adjacent said first and second ends, wherein at least one of said rings is movable along a substantial length of said collar and said rings being sized and configured so that the first ring can pass through the opening in said second ring;
   (c) each of said ends having attached thereto cooperating releasable connecting means for effecting a pressure releasable connection therebetween, said releasable connection means being capable of releasing said ends from connection upon application of a predetermined tension to the collar that is less than the tension which would strangle the animal wearing the collar; and
   (d) said ends being positioned when joined by said releasable connection means so that the metal rings are in substantial juxtaposition to one another to readily accept a leash clasp to both to form a conventional collar, to one ring only to operate as a safety collar or to said first ring after passage through the opening in said second ring to form a choke collar.

2. The collar of claim 1 wherein the releasable connecting means comprise Velcro.

3. The collar of claim 1 wherein at least one of said rings is held in engagement to said material within an elongated slot so that it is positionable adjacent the end or at a point remote from said end.

4. The collar of claim 3 wherein the material is in the form of a flat ribbon.

5. The collar of claim 4 wherein the metal rings have a "D" configuration.

6. The collar of claim 1 wherein the releasable connecting means comprises magnetic material.

7. The collar of claim 6 wherein capturing means are provided to hole said movable ring at a remote position.

8. The collar of claim 1 wherein the releasable connecting means are snap fasteners.

9. The collar of claim 1 wherein the collar includes a length adjusting means intermediate the connection ends thereof.

10. The collar of claim 1 wherein the releasable connecting means may be adjusted to vary the tension required to disengage them from a connected relationship.

* * * * *